United States Patent Office 2,985,640
Patented May 23, 1961

2,985,640

POLYMERIZATION CATALYST AND PROCESS

William E. Loeb, Berkeley Heights, N.J., assignor to Union Carbide Corporation, a corporation of New York No Drawing. Filed Sept. 15, 1959, Ser. No. 840,007

8 Claims. (Cl. 260—94.9)

This invention relates to the polymerization of alpha-olefins. More particularly, this invention is concerned with the use of novel catalyst compositions in converting normally gaseous alpha-monoolefins, such as ethylene and propylene, or mixtures thereof, to high molecular weight polyolefins.

It is known that polymerization of alpha-monoolefins can be brought about by contacting such compounds with a catalyst composition prepared from an ester or halide salt of a transition metal of group IVA, VA, or VIA of the Periodic Chart of the Atoms and an organometallic compound of a metal of group IA, IIA, or IIIB of the Periodic Chart of the Atoms. The transition metal compounds usually employed for such purpose are the transition metal halides, while the organometallic compounds usually employed are the alkyl derivatives of aluminum. Among the transition metal compounds which have been employed may be mentioned titanium trichloride, titanium tetrachloride, vanadium trichloride, vanadium tetrachloride, zirconium tetrachloride, tungsten tetrachloride, tungsten haxachloride and the like, while suitable organometallic compounds which have been employed include triisobutylaluminum, trioctylaluminum, tributylaluminum, triethylaluminum, triisoproplylaluminum, tridodecylaluminum, diethylaluminum chloride, diisobutylaluminum chloride, dioctylaluminum chloride, didodecylaluminum chloride, monoisobutylaluminum hydride, diethylaluminum hydride, diisobutylaluminum hydride, dioctylaluminum hydride, didodecylaluminum hydride, diethylberyllium, diisobutylberyllium, dioctylberyllium, ethylberyllium chloride, isobutylberyllium chloride, dodecylberyllium chloride, isobutyllithium, cyclohexyllithium, dodecyllithium, diisobutylmagnesium, dioctylmagnesium, didodecylmagnesium, isobutylmagnesium chloride, octylmagnesium chloride, dodecylmagnesium chloride and the like.

A serious disadvantage inherent in the use of transition metal halides as a cocatalyst for the polymerization of alpha-monoolefins is that the halogen present in such compounds is frequently incorporated into the polymer during polymerization, thereby imparting corrosive properties thereto. The presence of residual halogen in such polymers often results in the rapid corrosion of molds and other fabricating equipment employed in the production of finished polyolefin products.

It has now been discovered that polymerization of alpha-monoolefins can be brought about by contacting said alpha-monoolefins with a novel catalyst composition prepared from bis(cumene)chromium and an alkylmetallic compound of a metal of group IA, IIA, or IIIB of the Periodic Chart of the atoms. Since the novel catalyst compositions of this invention do not make use of the transition metal halides previously employed as a cocatalyst in effecting polymerization of alpha-monoolefins, the difficulties inherent in the use of such compounds have been eliminated.

The first component of the novel catalyst compositions useful in this invention is bis(cumene)chromium. Since this compound is free of halogen it is a particularly desirable cocatalyst for use in the polymerization of alpha-monoolefins.

The second component of the novel catalyst compositions useful in this invention is an alkylmetallic compound of a metal of group IA, IIA, or IIIB of the Periodic Chart of the Atoms wherein the alkyl groups each contain from 1 to 12 carbon atoms. Among such compounds may be mentioned triisobutylaluminum, trioctylaluminum, tributylaluminum, triethylaluminum, triisopropylaluminum, tridodecylaluminum, diethylmethylaluminum, diethylisobutylaluminum, diisobutylethylaluminum, diethylberyllium, diisobutylberyllium, dioctylberyllium, didodecylberyllium, methylethylberyllium, isobutyllithium, cyclohexyllithium, dodecyllithium, diisobutylmagnesium, dioctylmagnesium and didodecylmagnesium. These compounds can be employed individually or in various mixtures thereof. Of the compounds mentioned, triisobutylaluminum has been found to be the most useful.

The most preferable catalyst composition for polymerizing alpha-monoolefins according to the process of the instant invention comprises the product formed by admixing bis(cumene)chromium and triisobutylaluminum.

The novel catalyst compositions useful in polymerizing alpha-monoolefins according to the process of the instant invention are preferably employed for such purpose in an inert liquid hydrocarbon which serves as a diluent for the composition. By an "inert liquid hydrocarbon" is meant a liquid hydrocarbon which is non-reactive under the polymerization conditions employed in the process of the instant invention. While the hydrocarbons selected need not function as solvent for the catalyst composition or the polymers obtained by the process of the invention, they usually serve as solvent for the monomers employed in the polymerization. Among the inert liquid hydrocarbons applicable for such purpose may be mentioned saturated aliphatic hydrocarbons such as hexane, heptane, isooctane, highly purified kerosene and the like, saturated cycloaliphatic hydrocarbons such as cyclohexane, methylcyclohexane and the like, aromatic hydrocarbons such as benzene, toluene, xylene and the like, and chlorinated aromatic hydrocarbons such as chlorobenzene, ortho-dichlorobenzene and the like.

While the catalyst components and diluents useful in this invention can be mixed in any desired order, it is preferable to add the bis(cumene)chromium to the diluent prior to the addition of the alkylmetallic compound. Since water destroys the effectiveness of the resulting compositions to act as catalysts, techniques designed to exclude moisture should be employed during and after their preparation.

The bis(cumene)chromium and alkylmetallic compounds used in preparing the catalyst compositions useful in this invention can be employed together in ratios varying over rather broad ranges. In general, molar ratios of alkylmetallic compound to bis(cumene)chromium varying from about 0.2:1 to about 10:1 can be advantageously employed. Preferably, for efficiency and economy of operation, the ratio is maintained between 1:1 and 3:1. While polymerization proceeds at molar ratios outside the limits of the broadly disclosed range, no commensurate advantages are obtained by employing such ratios.

When an inert liquid hydrocarbon is employed as a diluent for the novel catalyst compositions useful in polymerizing alpha-monoolefins according to the process of the instant invention, the total amount of combined bis(cumene)chromium and alkylmetallic compound dispersed in such diluent is not narrowly critical and can vary over a wide range. Suitable mixtures of catalyst and diluent can be prepared by dispersing sufficient amounts of bis(cumene)chromium and alkylmetallic compound in the diluent to provide a total concentration of from 0.05 percent by weight to 50 percent by weight, preferably from 1.0 percent by weight to 25 percent by weight, of such metallic compounds in the admixture. While polymerization proceeds at concentrations outside the limits of the broadly disclosed range, no commensurate advantages are obtained by employing such concentrations.

The alpha-monoolefins which can be polymerized according to the process of the instant invention are those olefins which have only a single ethylenically-unsaturated carbon-to-carbon linkage, and preferably no more than about 12 carbon atoms. Such compounds can be graphically depicted by the formula $$CH_2=CHR$$

wherein R represents a hydrogen atom or a monovalent hydrocarbon radical free of aliphatic unsaturation and containing from 1 to about 10 carbon atoms, including alkyl radicals such as methyl, ethyl, propyl, isopropyl, butyl, isobutyl, amyl and the like, and aryl radicals such as phenyl, tolyl, naphthyl and the like. Illustrative of the alpha-monoolefins which can be polymerized in accordance with the process of this invention are such compounds as ethylene, propylene, 1-butene, 1-pentene, 1-hexene, 1-heptene, 1-octene, 1-nonene, 1-decene, 1-dodecene, 3-methyl-1-butene, 4-methyl-1-pentene, 3-methyl-1-pentene, 3-methyl-1-hexene, 4-methyl-1-hexene, 3,4-dimethyl-1-hexene, 4-butyl-1-octene, 5-ethyl-1-decene, styrene and the like. Such compounds can be polymerized individually so as to yield homopolymers, or in combination so as to yield copolymers, terpolymers, etc.

As the alpha-monoolefins which can be polymerized according to the process of the instant invention often exist in the gaseous state, it is customary to effect reaction by bubbling the gas through the catalyst composition. While it is preferable to continuously introduce such gaseous monoolefins into contact with the catalyst compositions of this invention, polymerization can also be effected by initially sealing a fixed amount of such monoolefins in a polymerization reactor with the catalyst compositions of this invention and allowing the reaction to proceed under autogeneous pressure with, if desired, further batchwise additions of monomer. In any event, reactive contact between monoolefin and catalyst composion should be maintained by constant stirring or agitation of the reaction mixture. Care should also be taken to exclude air and moisture from contact with the reaction mixture since these substances ordinarily interfere with polymerization. Such can be accomplished by techniques well known in the art.

When the monoolefins sought to be polymerized exist in the liquid state, the techniques described for polymerizing gaseous monomers can be altered and adapted as may be necessary and suitable for the polymerization of such compounds.

The pressures employed in effecting polymerization according to the process of the instant invention are not narrowly critical and can vary over a wide range. As a matter of convenience polymerization is usually effected under atmospheric pressure; however, pressures both above and below atmospheric pressure, for example pressures ranging from as low as 0.5 atmosphere to as high as 500 atmospheres, can also be employed whenever it is desirable to do so.

Polymerization according to the process of the instant invention readily occurs at temperatures ranging from as low as 0° C. to as high as 250° C., but is preferably effected at temperatures ranging from about 20° C. to about 80° C. Temperatures both above and below the broadly disclosed range can also be employed; however, no commensurate advantages are obtained by employing temperatures outside the limits of the broadly disclosed range.

After the polymerization reaction is complete, the catalyst composition can be inactivated by the addition thereto of water or an alcohol such as isopropanol. The polymer formed by the reaction can then be separated from the reaction mixture. As the polymer is generally insoluble in the reaction mixture, separation can usually be readily accomplished by filtration. Catalyst residues can be removed from the polymer by washing with suitable solvents. Heating the polymer in a mixture of isopropanol, water and hydrochloric acid has been found effective for this purpose.

The polymers produced by the process of this invention can be employed in the many uses commonly made of such compounds, such as in the production of fibers, films, coatings, molded articles and the like.

Unless otherwise specified, all parts and percentages, as used throughout this specification, are by weight. The Periodic Chart of the Atoms referred to throughout this specification is the 1956 Revised Edition published by W. M. Welch Manufacturing Company, 1515 Sedgwick Street, Chicago, Illinois, U.S.A.

The following examples are set forth for purposes of illustration so that those skilled in the art may better understand this invention, and it should be understood that they are not to be construed as limiting this invention in any manner.

EXAMPLE 1

*Polymerization of ethylene*

To a nitrogen-purged 100-ml. reactor equipped with a hollow-shaft stirrer, a thermometer, and inlet and exhaust tubes, were charged, in the order stated, 6.3 grams of a mixture containing 85 parts bis(cumene)chromium and 15 parts cumene, and 50 ml. of anhydrous isooctane. The resulting mixture was stirred at room temperature and atmospheric pressure in the absence of air while anhydrous ethylene gas was introduced into the reactor by means of the hollow-shaft stirrer and sparged through said mixture at the rate of 0.5 cubic foot per hour. Since no noticeable reaction occurred after a period of 15 minutes under the stated conditions, the temperature of the mixture was raised to 75–80° C. Heating the mixture at this temperature for 2½ hours still failed to produce any visible signs of reaction.

The temperature of the mixture was then cooled to below 40° C. and 4.0 grams of triisobutylaluminum were added thereto. A small amount of polymer immediately appeared in the reactor. The reaction was allowed to proceed for 20 minutes by bubbling ethylene through the mixture without further heating. At the end of this time, the temperature of the reaction mixture was raised to 75° C., ethylene was bubbled through for an additional 20 minutes, and the mixture was cooled to room temperature. Air was then introduced into the reactor along with ethylene for a period of sixty minutes. No visible reaction occurred during this period. At the end of this time, the contents of the reactor were poured into a mixture of 20 ml. of water, 100 ml. of isopropanol, and 10 ml. of hydrochloric acid. The resulting mixture was then boiled in order to dissolve catalyst residues, and filtered to separate the polyethylene that had been formed by the reaction. The polyethylene was dried at room temperature. The dried polymer, which was identified by infrared analysis, weighed 0.5 gram and had a reduced viscosity of 2.90 in decalin.

Reduced viscosity ($I_R$) is a measure of the molecular weight of a polymer, and may be defined by the equation $$I_R = \frac{\frac{\Delta N}{N_0}}{C}$$

wherein $\Delta N$ is the difference in seconds between the flow-time of a solution of polymer through a capillary viscometer and the flow-time of the solvent, $N_0$ represents the flow-time of the solvent, and C is the concentration of polymer in said solution in grams per 100 ml. of solution. Measurements were made at 135° C. using decalin as solvent, and a solution of 0.1 gram of polymer per 100 ml. of solution.

Polypropylene is produced in a manner similar to the procedure of Example 1 by substituting propylene for ethylene.

What is claimed is:

1. A process for polymerizing alpha-monoolefins which comprises contacting said alpha-monoolefins with a catalyst composition consisting of bis(cumene)chromium and an alkylmetallic compound of a metal selected from the group consisting of the metals present in groups IA, IIA, and IIIB of the Periodic Chart of the Atoms.

2. A process for polymerizing alpha-monoolefins having from 2 to about 12 carbon atoms which comprises contacting said alpha-monoolefins in an inert liquid hydrocarbon with a catalyst composition consisting of bis(cumene)chromium and an alkylmetallic compound of a metal selected from the group consisting of the metals present in groups IA, IIA, and IIIB of the Periodic Chart of the Atoms.

3. A process for polymerizing alpha-monoolefins having from 2 to about 12 carbon atoms which comprises contacting said alpha-monoolefins in an inert liquid hydrocarbon with a catalyst composition consisting of bis(cumene)chromium and triisobutylaluminum.

4. A process for polymerizing ethylene which comprises contacting said ethylene in an inert liquid hydrocarbon with a catalyst composition consisting of bis(cumene)chromium and an alkylmetallic compound of a metal selected from the group consisting of the metals present in groups IA, IIA, and IIIB of the Periodic Chart of the Atoms.

5. A process for polymerizing ethylene which comprises contacting said ethylene in an inert liquid hydrocarbon with a catalyst composition consisting of bis(cumene)chromium and triisobutylaluminum.

6. A process for polymerizing ethylene which comprises contacting said ethylene in isooctane with a catalyst composition consisting of bis(cumene)chromium and triisobutylaluminum.

7. A polymerization catalyst comprising the product formed by admixing bis(cumene)chromium and an alkylmetallic compound of a metal selected from the group consisting of the metals present in groups IA, IIA, and IIIB of the Periodic Chart of the Atoms.

8. A polymerization catalyst comprising the product formed by admixing bis(cumene)chromium and triisobutylaluminum.

References Cited in the file of this patent
UNITED STATES PATENTS 2,827,446   Breslow _____ Mar. 18, 1958